United States Patent Office 2,981,120
Patented Apr. 25, 1961

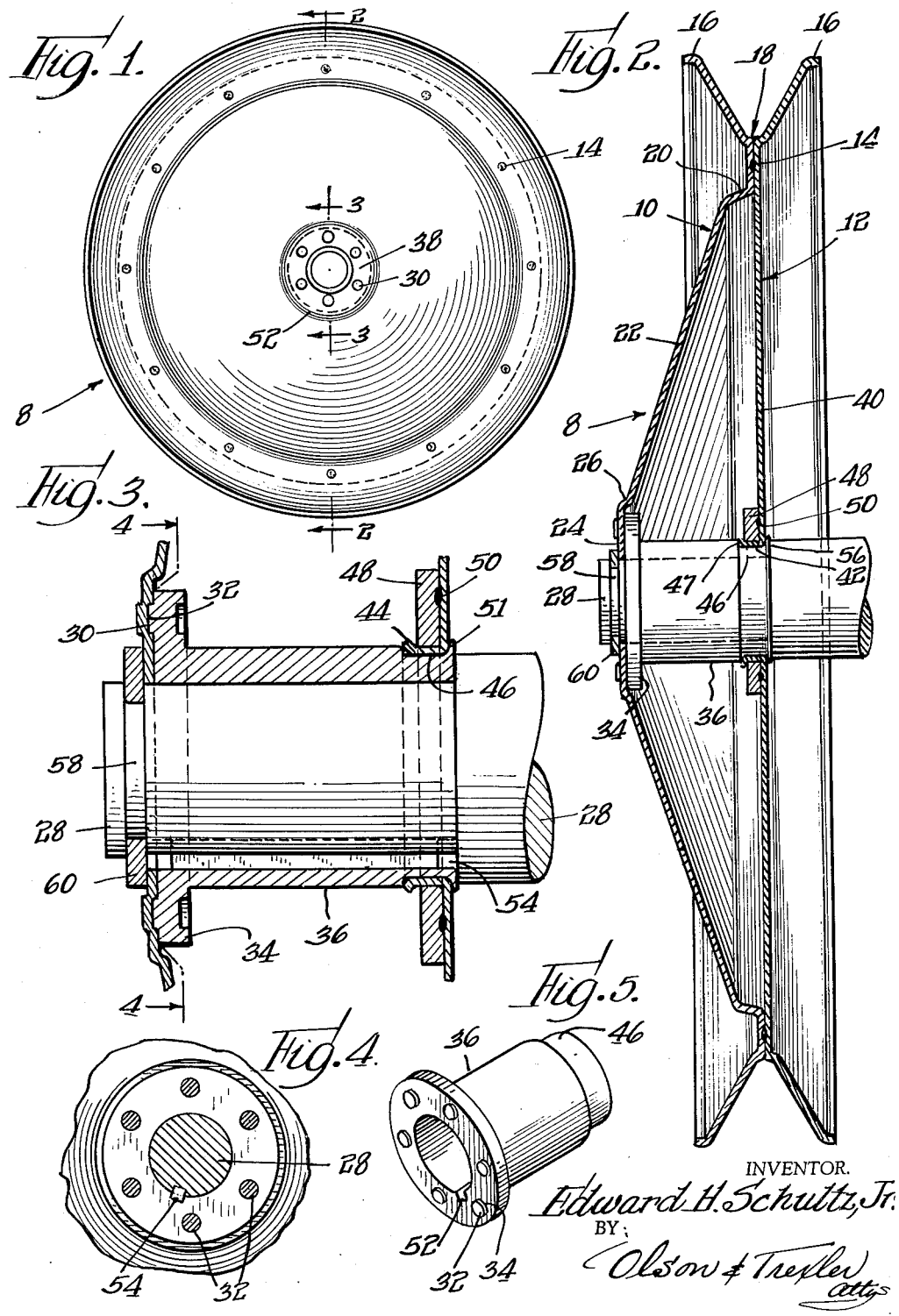
April 25, 1961     E. H. SCHULTZ, JR     2,981,120
SHEET METAL PULLEY WITH DRAWN HUB
Filed Jan. 2, 1959
INVENTOR.
Edward H. Schultz, Jr.
BY Olson & Trexler
attys

2,981,120

SHEET METAL PULLEY WITH DRAWN HUB

Edward H. Schultz, Jr., Chicago, Ill., assignor to The Nagel-Chase Mfg. Co., Chicago, Ill., a corporation of Illinois Filed Jan. 2, 1959, Ser. No. 784,603

4 Claims. (Cl. 74—230.8)

This invention is concerned generally with a pulley, and more particularly with a pulley consisting of two sheet material members securely attached to an axial hub.

Sheet material pulleys with axial hubs are well known in the art and have been used both as idler pulleys and driving pulleys. However, the sheet material pulleys now in use can not satisfactorily transmit high torque loads. When the pulleys now in use are subjected to relatively high torque loads, the welds commonly used in construction tend to shear and the sheet metal parts tend to slip with respect to the hub. No effective, economical mechanical key has heretofore been employed that will satisfactorily transmit these high driving forces. Sheet metal pulleys generally lack the rigidity of cast pulleys, and heavy gauge material has frequently been employed to supply rigidity when needed. Not only is the use of such heavy material uneconomical but it also adds unwanted inertia to systems in which the pulley is employed. Because of the flexible nature of the sheet material used, adequate rigidity and firm connections between the sheet material and the hub are difficult to obtain.

It is an object of this invention to provide a sheet material pulley of economical construction which is capable of transmitting relatively high torques.

It is a further object of this invention to provide a sheet material pulley of light weight construction that will possess good rigidity.

It is a still further object of this invention to provide a sheet metal pulley of economical construction with an axial hub member, in which the attachment of the sheet metal members to the hub is firm and strong.

A more specific object of this invention is to provide a sheet material pulley in which the sheet material members are mechanically keyed to the hub member in both the longitudinal and circumferential directions.

It is another specific object of this invention to provide a sheet material pulley with an axial hub member in which a sheet material member is reinforced in the proximity of its mounting on said hub.

Other and further objects and advantages of the present invention will be apparent from the following description when taken in connection with the accompanying drawings, wherein:

Fig. 1 is an end or face view of a sheet material pulley with an axial hub, produced in accordance with the principles of this invention;

Fig. 2 is a cross-sectional view thereof taken substantially along the line 2—2 in Fig. 1;

Fig. 3 is a fragmentary sectional view on an enlarged scale taken along the line 3—3 in Fig. 1;

Fig. 4 is a sectional view on a reduced scale taken along the line 4—4 in Fig. 3; and Fig. 5 is a perspective view of the hub member only.

Referring now in greater particularity to the drawings, there will be seen a pulley 8 embodying the principles of this invention and comprising two coaxial sheet material members 10 and 12. Each of these members is comprised of various coaxial segments of frustoconical, annular-uniplanar, or cylindrical configuration, each such segment integrally joined to its adjacent segment or segments within its same member. The two sheet material members 10 and 12 are interconnected by a ring of spot welds 14 near their outermost edges 16. Outlying this ring of welds 14 the two members 10 and 12 diverge to provide a pulley groove 18. Inwardly of the ring of welds 14, the first of said sheet material members 10 angles inwardly in two successive frustoconical segments 20 and 22, away from the plane of juncture of said two members 10 and 12, towards a central flat segment 24. This central segment 24 is offset still further from said plane of juncture by a short, nearly cylindrical segment 26. The central segment 24 is centrally apertured to fit snugly around a coaxial shaft 28, and it contains an annular ring of depressions 30, formed by partially stamping cylindrical segments from the sheet material. These depressions 30 fit snugly over corresponding lugs 32 which have been partially stamped from the flange segment 34 of a coaxial hub member 36 when the first sheet material member 10 is mounted on the hub 36. The engagement of the lugs 32 with the depressions 30 serves to locate the first sheet material member 10 relative to the hub 36, and to provide a rotational driving action between these two members. Spot welds 38 between adjacent lugs serve to interconnect the central segment 24 and the hub flange 34.

Inwardly of the annular ring of welds which interconnects the two sheet material members 10 and 12, the second of said members 12 consists of a large, flat segment 40 and a central cylindrical neck portion 42 projecting therefrom toward the first sheet material member 10. The neck portion 42 terminates in a short outwardly turned lip 44. The neck portion 42 and lip 44 fit snugly in an annular groove 46 in the outer surface of the hub 36. A flat annular washer 48 is positioned snugly around the outer surface of the neck portion 42 to prevent it from spreading or otherwise getting out of round. The washer 48 is spot welded at 50 to the second sheet material member 12.

The hub 36 is a tubular member with a flat annular flange 34 at one end, which flange contains the previously described lugs 32. The other end of the hub 36 includes a terminal reduced diameter portion 46. In assembling the pulley 8, the second sheet material member 12 is slid onto the reduced diameter portion 46 to the position in which the lip 44 of the neck portion 42 abuts the hub shoulder 47. The reduced diameter portion 46 protrudes slightly beyond the flat segment 40. This protruding end is then swaged outwardly at 51, thereby urging it against the outer surface of flat segment 40 and trapping the neck 42 in fixed relation to the hub 36.

The first sheet material member 10 and the hub member 36 are provided with a keyway 52. The shaft 28 is provided with a reduced diameter end which fits snugly into the hub 36 and which is keyed thereto by a key 54. The swaged end of the hub 36 abuts the shoulder 56 of the shaft 28, while the sheet material at 24, adjacent to the flanged end of the hub, abuts a split ring 60. The split ring 60 is inserted in an annular groove 58 in the shaft 28. The pulley 8 is held firmly in position between the split ring 60 and the shoulder 56.

The pulley herein shown and described possesses several features which contribute to its excellent rigidity. The cross-sectional view in Fig. 2 shows the near triangular configuration which exists between the pulley's three main members in any given radial plane. In addition, the firm, mechanically keyed attachment of each sheet material member to the hub member provides fixed end support to the spans existing between points of attachment of the sheets. The neck portion of member 12 and the reinforcing washer in conjunction therewith serve to stiffen the only major flat portion of the pulley, segment 40. Offset portions 26 and 20 provide additional rigidity to the structure.

It will be understood that the specific example of the invention herein shown and described is for illustrative purposes only. Various structural changes are possible and form a part of the invention in so far as they fall within the spirit and scope of the appended claims.

The invention is hereby claimed as follows:

1. A pulley comprising: a first and a second annular sheet material member, said members being securely coupled together adjacent their outer peripheries and with the central portions thereof spaced apart and perforated to define a central bore; and a central hub member having a radially extending flange provided with interfitting means meshing with corresponding means on said first sheet material member, said interfitting means non-rotatably mounting said coupled sheet material members to said hub member, said hub member further having an annular groove spaced apart from said flange for fixedly engaging said second sheet material member, said second sheet material member including a centrally disposed neck portion of cylindrical configuration for engaging said annular groove and further including a flat annular washer secured to said second sheet material member to circumscribe said neck portion preventing distortion thereof, whereby said coupled sheet material members are mechanically keyed to said hub member.

2. A pulley comprising: a first and a second annular sheet material member, said members being securely coupled together adjacent their outer peripheries and with the central portions thereof spaced apart and perforated to define a central bore; and a central hub member provided with interfitting means adjacent one end thereof meshing with corresponding means on said first sheet material member, said interfitting means non-rotatably mounting said coupled sheet material members to said hub member, said hub member further having an annular groove toward the opposite end thereof for fixedly engaging said second sheet material member, said second material member including a centrally disposed neck portion of cylindrical configuration for engaging said annular groove and further including a flat annular washer secured to said second sheet material member to circumscribe said neck portion preventing distortion thereof, whereby said coupled sheet material members are mechanically keyed to said hub member.

3. In combination with a shaft, the provision of a pulley comprising a first and a second annular sheet material member, said members being securely coupled together adjacent their outer peripheries and with the central portions thereof spaced apart and perforated to define a central bore; and a central hub member receiving said shaft and having a radially extending flange provided with interfitting means meshing with corresponding means on said first sheet material member, said interfitting means non-rotatably mounting said coupled sheet material members to said hub member, said hub member further having an annular groove spaced apart from said flange for fixedly engaging said second sheet material member, said shaft having shoulder means spaced outwardly from the first sheet material member, and a washer interposed between said shoulder means and the first sheet material member to maintain the interfitting means in mesh, said second sheet material member including a centrally disposed axial neck portion of cylindrical configuration for snugly engaging the side walls of said annular groove to prevent axial migration of the second sheet material member on the hub member.

4. In combination with a shaft, the provision of a pulley comprising a first and a second annular sheet material member, said members being securely coupled together adjacent their outer peripheries and with the central portions thereof spaced apart and perforated to define a central bore; a central hub member receiving said shaft and having a radially extending flange provided with interfitting means meshing with corresponding means on said first sheet material member, said interfitting means non-rotatably mounting said coupled sheet material members to said hub member, said hub member further having an annular groove spaced apart from said flange for fixedly engaging said second sheet material member, said second sheet material member including a centrally disposed neck portion of cylindrical configuration for engaging said annular groove and further including a flat annular washer secured to said second sheet material member to circumscribe said neck portion preventing distortion thereof, whereby said coupled sheet material members are mechanically keyed to said hub member, said shaft having a circumferential groove adjacent said hub member, and a washer disposed in said groove for locating the hub member on said shaft.

References Cited in the file of this patent

UNITED STATES PATENTS

| | | |
|---|---|---|
| 281,618 | Crowell | July 17, 1883 |
| 612,022 | Corscaden | Oct. 11, 1898 |
| 766,439 | Gilbert | Aug. 2, 1904 |
| 1,266,579 | Garcelon | May 21, 1918 |
| 1,612,169 | Bingham | Dec. 28, 1926 |
| 1,844,100 | Mozni | Feb. 9, 1932 |
| 2,188,953 | Mitchell | Feb. 6, 1940 |
| 2,337,308 | Buote | Dec. 21, 1943 |
| 2,620,675 | Meadows et al. | Dec. 9, 1952 |
| 2,757,027 | Beranek | July 31, 1956 |

FOREIGN PATENTS

| | | |
|---|---|---|
| 844,236 | Germany | July 17, 1952 |